United States Patent
Kozma et al.

[15] 3,637,290
[45] Jan. 25, 1972

[54] OPTICAL DATA PROCESSOR PROVIDING ALL RANGE TRACKING AND ALL RANGE FOCUSING

[72] Inventors: Adam Kozma, Ann Arbor; Emmett N. Leith, Plymouth; Norman G. Massey, Ypsilanti, all of Mich.

[73] Assignee: The United States of America as represented by the Secretary of the Air Force

[22] Filed: Dec. 1, 1965

[21] Appl. No.: 510,992

[52] U.S. Cl. .......................... 350/162 SF, 350/266
[51] Int. Cl. ................................................ G02b 5/18
[58] Field of Search ............... 350/181, 190, 266, 162; 88/1

[56] References Cited

UNITED STATES PATENTS

| | | | |
|---|---|---|---|
| 2,121,567 | 6/1938 | Newcomer | 350/190 X |
| 2,508,892 | 5/1950 | Sachtleben | 350/190 |
| 2,614,460 | 10/1952 | Miller | 350/181 |
| 3,051,051 | 8/1962 | Jeffreee | 350/190 X |
| 3,131,596 | 5/1964 | Cole | 350/181 UX |
| 3,143,732 | 8/1964 | Leighton et al. | 350/181 UX |

Primary Examiner—Rodney D. Bennett, Jr.
Assistant Examiner—Daniel C. Kaufman
Attorney—Harry A. Herbert, Jr. and Richard J. Killoren

[57] ABSTRACT

An optical data processor for Doppler radar information stored on a film uses a four-lens telescopic optical system to cause the azimuth target histories to come to focus on a plane surface where they can be recorded. To provide all range focus with this system, two of the lenses are cylindrical lenses to provide a two-lens telescopic system in the range dimension with different magnifications in the two dimensions. The input and output films are tilted with respect to the optical axis to provide all range focusing and all range tracking in the same output plane.

2 Claims, 10 Drawing Figures

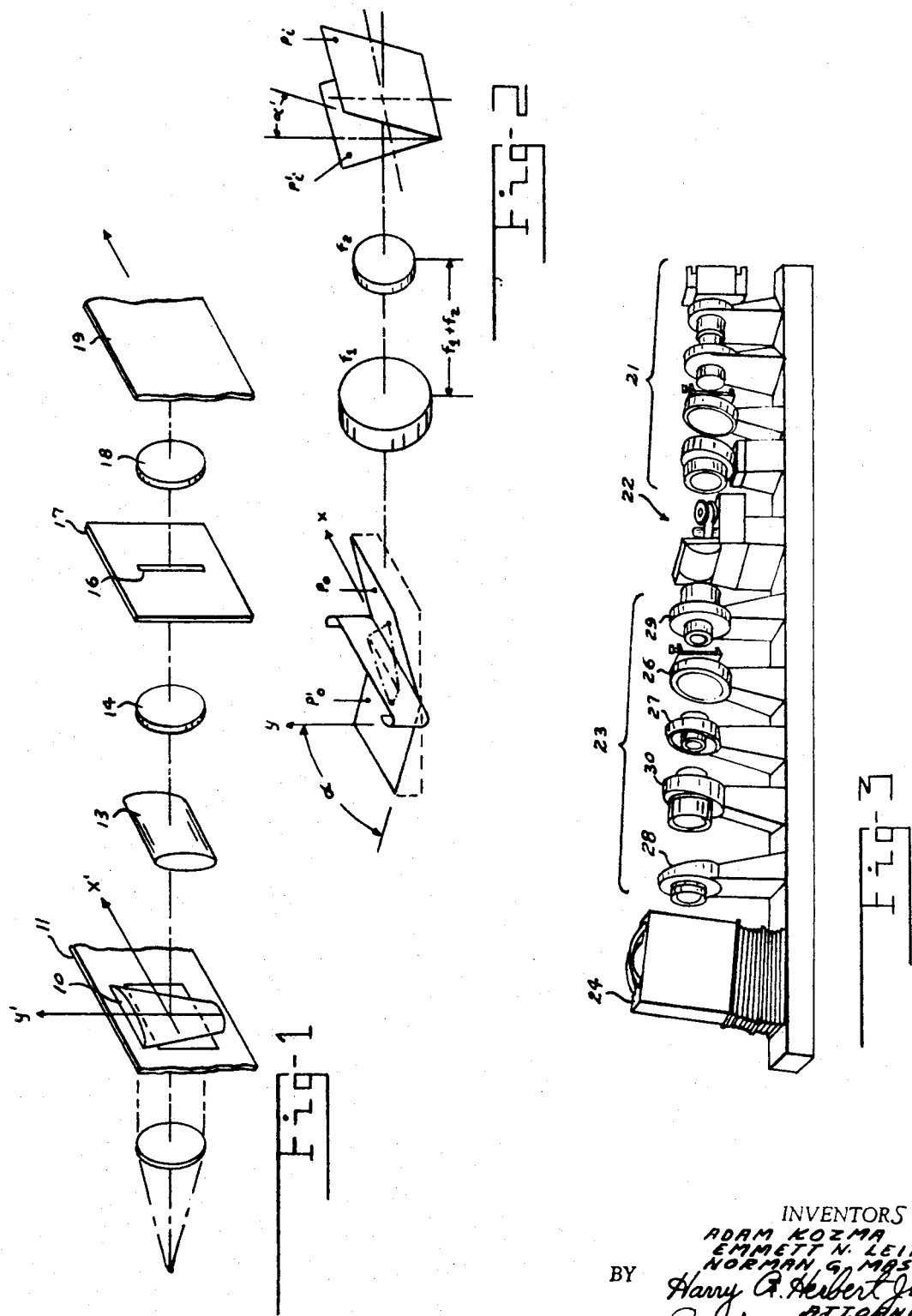

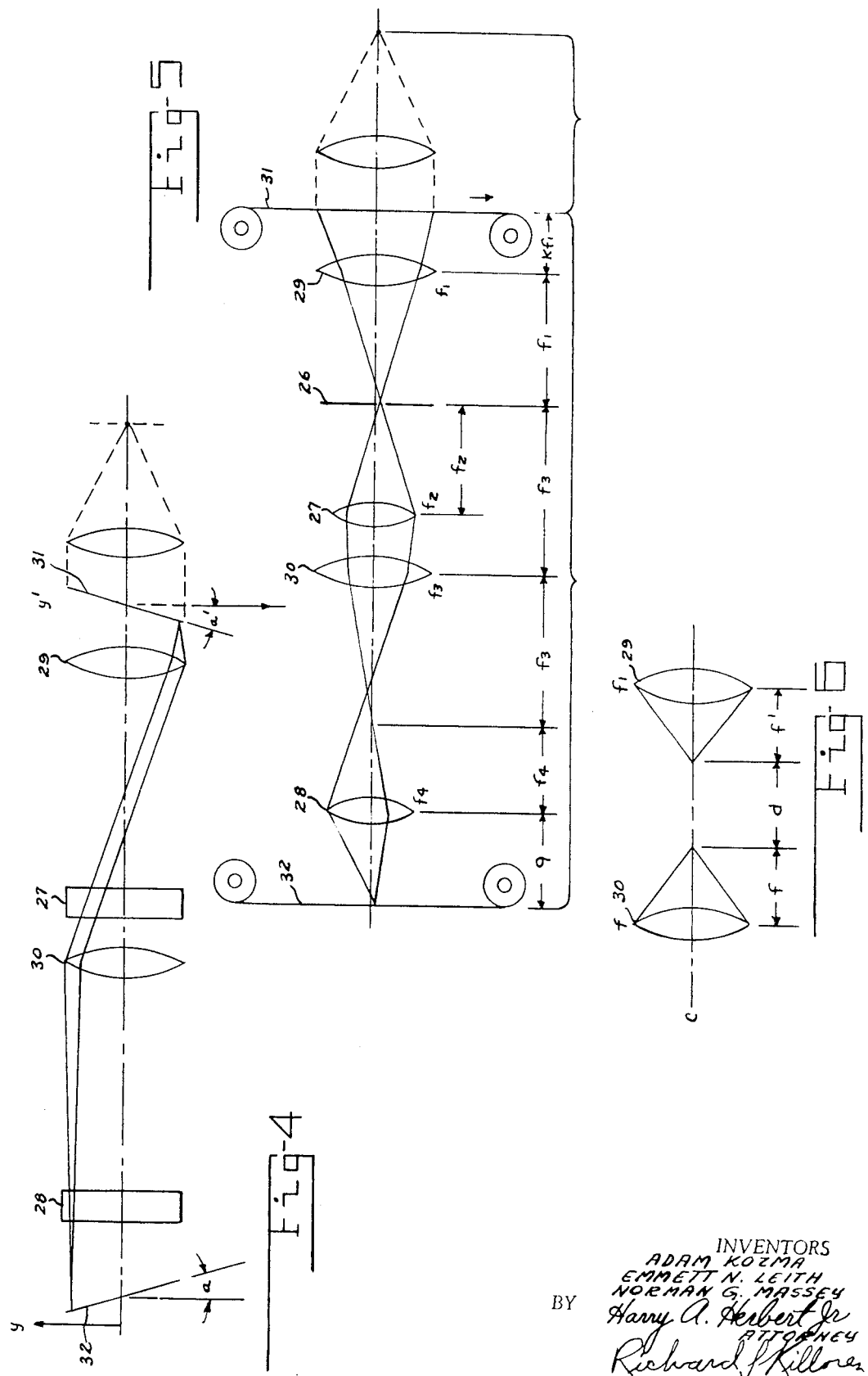

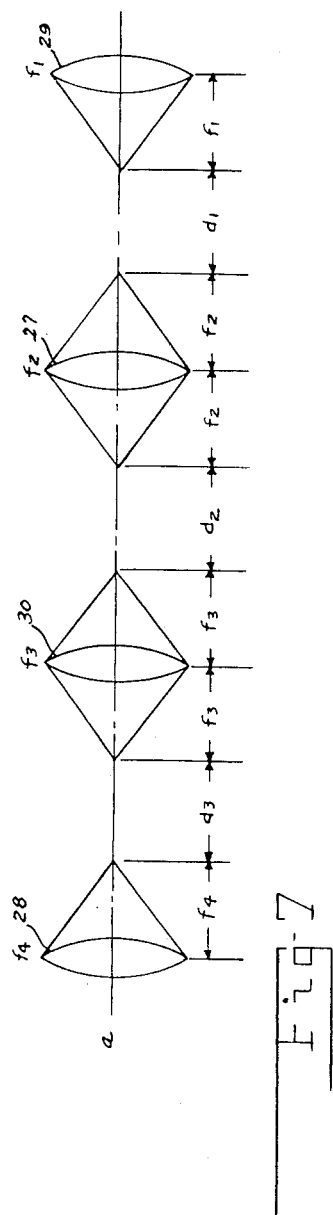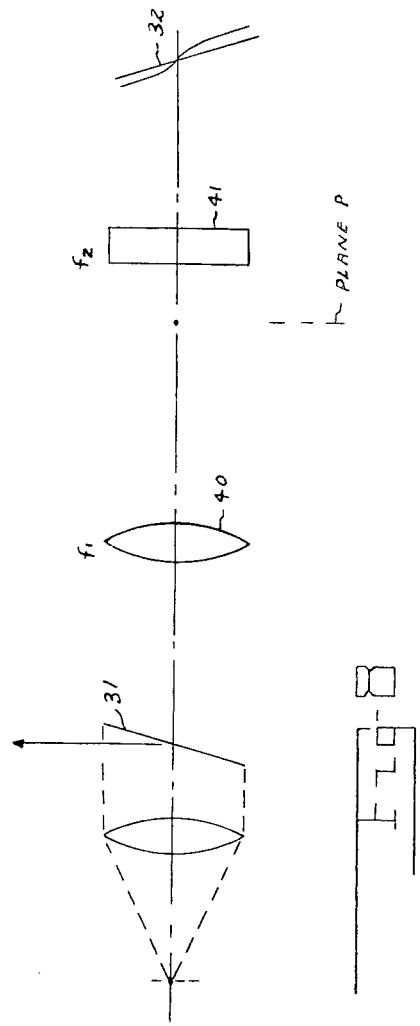

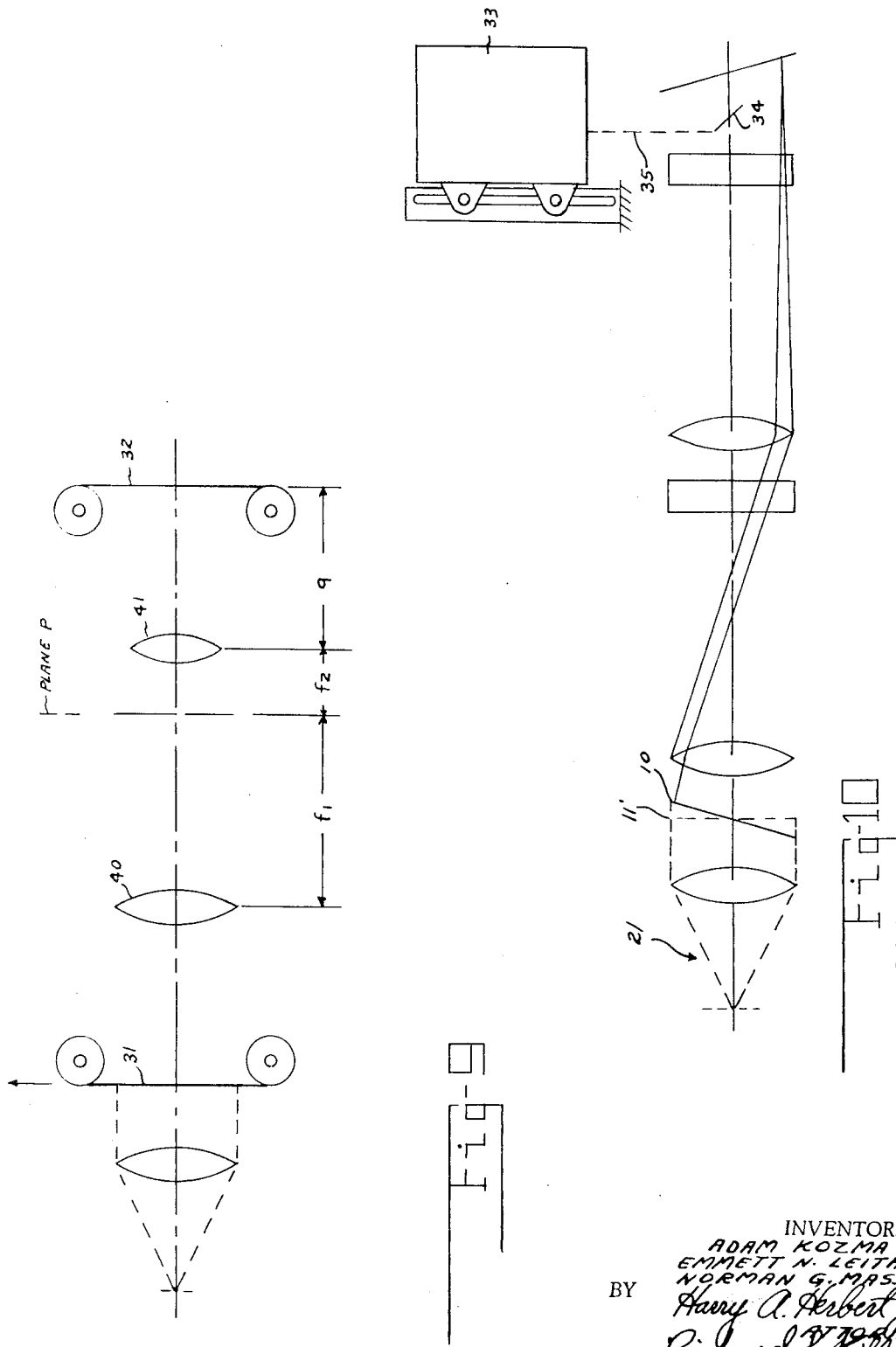

OPTICAL DATA PROCESSOR PROVIDING ALL RANGE TRACKING AND ALL RANGE FOCUSING

This invention relates to an optical data processor in which the signal film and the output film are both tilted.

One object of the invention is to provide an optical data processor for Doppler radar information stored on a film, which provides all range tracking as well as all range focusing.

Another object of the invention is to provide an optical data processor which provides all range tracking and all range focusing with fewer optical elements than prior art devices.

A further object of the invention is to provide an optical data processor which reduces interference fringes in the optical system.

These and other objects will be more fully understood from the following description taken with the drawing wherein:

FIG. 1 shows one type of prior art data processor which provides all range focusing but not all range tracking;

FIG. 2 is a schematic illustration showing the image planes formed by azimuth histories recorded on a signal film;

FIG. 3 is a perspective view of a data processor according to the invention;

FIG. 4 is a schematic view of the data processor of FIG. 3 showing the range optical processing system;

FIG. 5 is a schematic view of the data processor of FIG. 3 showing the azimuth optical processing system;

FIG. 6 is a schematic illustration of a two-lens system used to illustrate the range optical processor of FIG. 4;

FIG. 7 is a schematic illustration of a four-lens system used to illustrate the azimuth optical processor of FIG. 5;

FIG. 8 is a schematic illustration of the range optical system for a modified optical processor;

FIG. 9 is a schematic illustration of the azimuth optical system for the optical processor of FIG. 8; and FIG. 10 shows how the input and output films are positioned in the device of FIGS. 3 and 8.

In high resolution radar systems, coherent video returns from point scatterers in the radar field are recorded on a strip of photographic film. The distance across the film and along the film are scaled representations of radar range and azimuth, respectively. Generally, the rectangular coordinates $(x,r)$ are assigned to the film, where $x=X/p$
$r=R/q$
$X$ = the azimuth coordinate of the radar field
$R$ = the range coordinate of the radar field
$p$ and $q$ are recording scale factors.

For practical purposes, $p$ is usually chosen less than $q$ so that the signal film coordinates are stretched out in azimuth. The amount of stretching is measured by the ratio $q/p$; generally called aspect ratio and assigned the symbol $K$.

The recorded signal from a point scatterer, along a line on the film where $r$ is a constant, is a linearly frequency-modulated grating. The grating is, in fact, a Fresnel zone plate which has focal properties similar to those of lens 10 in FIG. 1 and focal lengths given by $$f = \frac{\pm 1}{2p^2} \frac{\lambda_R}{\lambda_L} R$$

when the signal film is placed in a beam of collimated monochromatic light of wavelength $\lambda_L$ with $\lambda_R$ being the wavelength of the radar radiation.

The focal lengths of a zone plate history are proportional to the radar range $R$ of the target producing the zone plate. The position, relative to the edge of the film, at which a signal is recorded is also proportional to $R$; therefore, the locus of focal points of all the target histories are two planes tilted with respect to the signal film plane. One is a virtual image produced by the negative focal length of the zone plate signals; the other is a real image, produced by the positive focal length of the signals. These planes are called the azimuth focal planes, since they are the planes in which the signals are in sharp azimuth focus.

In the range dimension, two situations are possible. If optical pulse compression is used, then in the range direction as in the azimuth direction the signals behave like Fresnel zone plates. In the range direction, however, the focal lengths are not range dependent. The locus of range direction focal points is therefore two planes parallel to the plane of the signal film. If optical pulse compression is not used or the compressed pulse is recorded on the film, then the position at which the signals are focused in the range direction becomes the plane of the signal film itself. In either case, the azimuth focal planes are tilted with respect to the signal film plane, and the range focal planes are parallel to, or coincident with, the signal film plane. The optical system which processes the signal film has the task of bringing one pair of azimuth and range focal planes into coincidence, so that sharp azimuth focus and range focus occur together. The images contained on the other pair of planes are rejected in the processing by spatial filtering.

Various optical systems have been used for processing the film record from a Doppler radar system to obtain a high resolution map. One of these systems is shown in FIG. 1. A conical lens 10 is placed adjacent the signal film 11 to provide all range focusing. Since the optical properties of the signal film are not the same in azimuth as in range, an astigmatic optical system is needed. Lenses 13 and 14 are required to bring the target information on the signal film to focus on the slit 16 in mask 17. Lens 18 then images slit 16 on the output film 19.

What is meant by tracking may be explained with respect to the spatial domain processor of FIG. 1. The output is taken along the line $x'=0$ in the output plane. The output variable $x'$ represents displacement of the signal film, and is converted to a variable on the final film by having the final film move in synchronism with the signal film. If the entire output plane, instead of only the position $x'=0$, is observed, one finds that the high resolution image does indeed extend throughout the plane rather than only at the position $x'=0$. However, this image is distorted, being magnified differently at short radar ranges than at long ranges. As the signal film is moved through the aperture, the output image moves in synchronism, but moves faster at close ranges and slower at long ranges.

Tracking means opening the output slit to a width greater than one resolution element, and causing the recording film to move with the image in such a manner that no relative motion occurs between them. This increases the exposure received by the final film and can speed processing time by a factor of 100 or more. In addition, noise produced by scattering from the lens surfaces, etc., is reduced by an averaging process. Tracking is thus a desirable feature of the processor.

Optical systems have been proposed and built which have provided both all range focusing and all range tracking. These systems accomplished this by means of optical elements, namely cylindrical lenses, which are tilted with respect to the optical axis.

It has been found through experiment that tilted optical elements have the property of treating sets of rays from different range elements in a differential manner and thus reduces the efficiency, in terms of output clarity, of the optical processing system.

According to this invention, use is made of a telescopic system to accomplish all range focusing and all range tracking.

In FIG. 2, object planes $P_o$ and $P'_o$ are the previously mentioned planes formed by azimuth histories recorded on the signal film. If these object planes are imaged by a telescopic optical system comprising lenses $f_1$ and $f_2$, the resultant image will be the pair of planes $P_i$ and $P'_i$, in which the lateral magnification is the same for all portions of the object. Because of this, if the object planes are moved, by moving the signal film in the azimuth direction, the image planes will move in a manner which depends not upon range but only upon the motion of the signal film. This simple telescopic optical system constitutes a tracking radar processor since it causes the azimuth target histories to come to focus on a plane surface where they not only can be recorded but can also be tracked, by moving the recording surface in synchronism with the moving focused targets. Of course, this optical system has no means of providing range focus and hence is not a practical solution to the processor problem.

However, if a two-lens telescopic system were used in the range dimension and a four-lens telescopic system were used in the azimuth dimension, the two optical systems could be made to have different magnifications so that the signal histories on the signal film can be brought to a focus in the same output plane to provide all range focusing and all range tracking. Use is made of two cylindrical lenses and two spherical lenses to provide a two-lens telescopic system in the range dimension and a four-lens telescopic system in the azimuth dimension.

Reference is now made to FIG. 3 of the drawing which shows an optical processor having a standard processor illuminating system 21, a signal film transport system 22, optical processing system 23, and recording camera 24. The illuminating system 21 can be any illuminating system that will provide coherent illumination for the signal film collimated in the azimuth direction. The optical processing system 23 has two cylindrical lenses 27 and 28, two spherical lenses 29 and 30, and a spatial filter 26 for removing the undesired harmonics.

As shown more clearly in FIG. 4 the signal film 31 and the output film 32, which is located in camera 24, are tilted in the range dimension at an angle $a$ with respect to the axis of the optical system. The lens system 29 and 30 acts as a two-lens telescopic system to image all of the range elements from the signal film 31 onto the output film 32 preferably with unity magnification. To satisfy the condition for the two-lens system 29 and 30 to act like a telescope the distance $d$, as shown in FIG. 6, between the front focal plane of lens 29 and the back focal plane of lens 30 must be equal to zero, $$d=0.$$

Therefore, the spacing between lens 29 and lens 30 is equal to the sum of their focal lengths.

It has been found that a four-lens system will act like a telescope, that is, the magnification is independent of object position, provided the lens system meets the requirement $$d_1 d_2 d_3 - f_2^2 d_3 - f_3^2 d_1 = 0$$

with the distances and focal lengths as shown in FIG. 7. Thus the lens elements 27 and 28 must be located with respect to elements 29 and 30 to satisfy this expression for the optical system in the azimuth direction.

The input film and output film are then positioned in the manner shown in FIG. 10.

A standard microscope 33 is positioned to observe the center of the output film in camera 24 with the aid of half-silvered mirror 34. The mirror 34 is supported by the microscope 33 as shown schematically at 35, so that the mirror will move as the microscope is moved perpendicular to the optical axis of the data processor.

The input film 11' and camera 24 are then moved along the optical axis until range focus simultaneously with azimuth focus is achieved at the center of the film.

The tilt of the input film 11' and camera 24 are adjusted as the mirror 34 is scanned across the output film to bring the tilt of the azimuth image plane into coincidence with the tilt of the range image plane, so that the azimuth focus and range focus are achieved over the whole width of the output film. The speed of the output film is then set so that the film speed equals the speed of the output image moving across the output plane.

An approximate system, requiring fewer optical elements, for obtaining all range focusing and all range tracking which may be used in some cases is shown in FIG. 8. The lens 40 is a spherical lens which operates near unity magnification in the range dimension and images the tilted range plane into a curved tilted output range image as shown at 25. Cylindrical lens 41, as shown in FIG. 9, then acts with lens 40 to provide a two-lens telescopic system to image the azimuth plane into an azimuth output plane that nearly coincides with the range image. The input film 31 and output film 32 are then positioned as with the device of FIG. 3.

There is thus provided an optical data processor for Doppler radar information which provides all range focusing and all range tracking.

While certain specific embodiments have been described, it is obvious that numerous changes may be made without departing from the general principle and scope of the invention.

We claim:

1. An apparatus for processing a signal film, having thereon Doppler radar spatial frequency information along the length of the film and range information across the film, comprising: means for directing a beam of coherent light through said film along a predetermined path; said beam being collimated in the azimuth direction of the Doppler frequency information on said film; means for moving said signal film through said beam at a predetermined rate in the azimuth direction with the range dimension of said film being tilted at a predetermined angle with respect to said beam path; an output film in said beam path; first optical means between said signal film and said output film for imaging the range dimension of said signal film substantially in an output plane which is tilted with respect to said beam path; a second optical means, including said first optical means, for imaging the azimuth plane of said signal film substantially into coincidence with said tilted output plane; filter means in said beam path, for removing the undesired harmonics from said beam; and means for moving an output film across said beam in the azimuth direction in said tilted output plane at a predetermined rate with respect to the movement of said signal film.

2. The device as recited in claim 1 wherein, said first optical means is a two-lens telescopic system and wherein said second optical means is a four-lens telescopic system, with said two-lens telescopic system consisting of two spherical lenses and said four-lens telescopic system consisting of two cylindrical lenses and said two spherical lenses.

* * * * *